United States Patent [19]

Hasbun

[11] Patent Number: 5,640,529
[45] Date of Patent: Jun. 17, 1997

[54] METHOD AND SYSTEM FOR PERFORMING CLEAN-UP OF A SOLID STATE DISK DURING HOST COMMAND EXECUTION

[75] Inventor: Robert N. Hasbun, Shingle Springs, Calif.

[73] Assignee: Intel Corporation, Santa Clara, Calif.

[21] Appl. No.: 714,504

[22] Filed: Sep. 16, 1996

Related U.S. Application Data

[63] Continuation of Ser. No. 99,192, Jul. 29, 1993, abandoned.

[51] Int. Cl.$^6$ .............................. G06F 13/00; G06F 1/14; G06F 9/00
[52] U.S. Cl. ................... 395/430; 395/494; 395/826; 395/557; 395/672; 395/622
[58] Field of Search ..................... 395/430, 439, 395/484, 494, 826, 827, 182.03, 183.18, 182.04, 551, 557, 670, 672, 622; 365/185.11, 218, 900

[56] References Cited

U.S. PATENT DOCUMENTS

| | | | |
|---|---|---|---|
| 3,648,255 | 3/1972 | Beausoleil et al. | 305/73 |
| 4,430,727 | 2/1984 | Moore et al. | 395/442 |
| 4,642,759 | 2/1987 | Foster | 395/500 |
| 4,802,117 | 1/1989 | Chrosny et al. | 395/182.03 |
| 4,896,262 | 1/1990 | Wayama et al. | 395/500 |
| 4,958,315 | 9/1990 | Balch | 395/500 |
| 5,077,737 | 12/1991 | Leger et al. | 395/182.04 |
| 5,111,385 | 5/1992 | Hattori | 395/484 |
| 5,131,089 | 7/1992 | Cole | 395/500 |
| 5,200,959 | 4/1993 | Gross et al. | 371/21.6 |
| 5,337,275 | 8/1994 | Wells et al. | 365/185.11 |
| 5,341,330 | 8/1994 | Wells et al. | 365/185.33 |
| 5,341,339 | 8/1994 | Wells | 365/185.11 |
| 5,355,483 | 10/1994 | Serlet | 395/481 |
| 5,357,475 | 10/1994 | Hasbun et al. | 395/430 |
| 5,404,485 | 4/1995 | Ban | 395/412 |
| 5,437,020 | 7/1995 | Wells et al. | 395/182.04 |

FOREIGN PATENT DOCUMENTS

| | | |
|---|---|---|
| 2088442 | 7/1993 | Canada . |
| 0175458A2 | 3/1986 | European Pat. Off. . |
| 0392895 | 10/1990 | European Pat. Off. . |
| 2251323 | 1/1992 | United Kingdom . |
| 2251324 | 1/1992 | United Kingdom . |

OTHER PUBLICATIONS

Markus A. Levy and Dale Elbert, "Solutions for High Density Applications Using Intel Flash Memory," Intel Application Note AP-343, pp. 6-297 through 6-364 (Oct. 1990).

"Solid-State Mass Storage Arrives," Product Feature, Memory Card Systems & Design, Jul./Aug. 1992.

(List continued on next page.)

*Primary Examiner*—Glenn Gossage
*Attorney, Agent, or Firm*—Blakely, Sokoloff, Taylor & Zafman

[57] ABSTRACT

A system and method for converting invalid user data within a solid state disk into free memory during time allotted to execute a host command from a standard interface. Clean-up states are part of a clean-up state machine which controls the conversion of the invalid user data into free memory. Whenever a command interrupt is received from the standard interface, a watchdog timer is set to the maximum time allotted to execute the command. The command is executed first, and then a number of clean-up states to be executed in the remaining time is calculated. A counter is set equal to that number. Thereafter, a clean-up state is executed and the counter is decremented. Execution of clean-up states and decrementing of the counter continues until either the counter indicates all states have been executed or the timer indicates that all allotted time has expired. In one embodiment, the solid state disk is included in a computer system having a central processing unit, and the solid state disk includes a flash memory array and a memory array controller.

23 Claims, 6 Drawing Sheets

OTHER PUBLICATIONS

"Optimal Solid State Disk Architecture for Portable Computers," Dan Auclair, pp. 811–815, Proceedings of Silicon Vally P.C. Design Conference, Jul. 9, 1991.

Walter Chen, Reprint of "Flash: Big News in Storage?", Nov./Dec. 1992 Edition of Storage Magazine, pp. 10–4 through 10–7.

Robinson, Kurt, "Trends in Flash Memory System Design", *Wescon Conference Record*, Nov. 1990, pp. 468–472.

FIG_1

FIG_2

FIG_3

FIG_4

FIG_X

FIG_9

METHOD AND SYSTEM FOR PERFORMING CLEAN-UP OF A SOLID STATE DISK DURING HOST COMMAND EXECUTION

This is a continuation of application Ser. No. 08/099,192, filed Jul. 29, 1993, now abandoned.

FIELD OF THE INVENTION

The present invention pertains to the field of computer storage systems. More particularly, the present invention pertains to a method of performing clean-up of a solid state memory array during time allowed for host command execution.

BACKGROUND OF THE INVENTION

Most prior personal computers include many types of memory storage devices. Hard magnetic disk drives are used typically for mass storage, while different types of semiconductor memories are used for other purposes.

The non-volatility of hard magnetic disk drives is one of the chief reasons for their use. They may be turned on and off without loss of data. Hard drives store data on concentric tracks. Each track includes several sectors, each of which is typically 512 bytes in length. Reads and writes to magnetic disk drives occur one bit at a time.

A typical user file stored on a magnetic disk drive occupies many sectors, randomly located on the surface of the disk drive. A file allocation table (FAT) allows for the location of each sector of the file by storing a chain of pointers for the file. Each pointer points to the next sector of the file.

Hard drives suffer from a number of disadvantages. Their size, their height in particular, often makes them unattractive for use in portable and lap top computers. The height of a hard disk drive has often been a limiting factor in attempts to reduce computer size to make computers more portable. Hard drives also consume relatively large amounts of power, which makes them even less attractive for computers that are battery powered.

Hard drives are less than ideal for use in computers that will be used out-of-doors. Magnetic disk drives are extremely sensitive to vibration and shock. Additionally, magnetic drives do not tolerate well the dust and humidity of associated with much of the great outdoors.

Semiconductor memories, also referred to as solid state memories, do not suffer from many of the disadvantages of magnetic disk drives. They are small and rugged and consume significantly less power than magnetic drives.

One type of non-volatile semiconductor memory is the FLASH electrically erasable programmable read only memory (FLASH memory). FLASH memories can be programmed by the user and once programmed retain their data until erased. FLASH memories are erased by erasing a block of memory at a time. A block is a relatively large amount of data, 64 Kbytes or 65,536 bytes.

A FLASH memory cell is erased when the net charge on the floating gate is neutral. An erased FLASH bit is referred to as a "1." Conversely, a FLASH memory cell is programmed when the net charge on the floating gate is negative. A programmed FLASH bit is referred to as a "0." A FLASH memory cell cannot be reprogrammed without a prior erasure with one exception. Any FLASH bit can be programmed to a 0 at any time.

In some prior FLASH memories the programming and erasure is controlled internally by a write state machine or a command register. Internal control of programming and erasure lessens the knowledge and time required to program and erase the FLASH memories. However, FLASH erase time times remain relatively slow despite internal control. Erase cycle time is on the order of one to two seconds. If an erase must occur before every write or re-write of a sector of data it is not possible to approach magnetic disk drive write times using FLASH memory.

In some FLASH memories, data is written to a new location each time the data is revised, rather than erasing the previous physical location and writing the revised data to that same physical location. As a result of this practice, the FLASH memory becomes sprinkled with invalid data which should be recovered. However, reclamation of the memory space occupied by this invalid data can be overrun during prolonged user reads or writes to the FLASH memory.

SUMMARY OF THE INVENTION

A method of performing clean-up of a solid state disk drive during time allotted to execute a host command from an industry standard interface is described. Whenever a command interrupt is received from the industry standard interface a timer is set to the maximum time allowed to execute the host command. The host command is then executed. Prior to returning control of the solid state disk to the interface, a number of clean-up states to be executed is calculated and a counter is set equal to that number. Thereafter, a clean-up state is executed and the counter is decremented. Execution of clean-up states and decrementing of the counter continues until either the counter indicates all states have been executed or the timer indicates that the allotted time has expired.

An object of the present invention is to prevent conversion of invalid user data to free memory from being overrun during prolonged user reads or writes to a solid state disk.

Another object of the present invention is to provide sufficient free memory in a solid state disk for prolonged host reads and writes.

A still further object of the present invention is to ensure that host read and write commands are executed by a solid state disk within the period of time specified by an industry standard disk drive interface.

Other objects, features, and advantages of the present invention will be apparent from the accompanying drawings and the detailed description that follows.

BRIEF DESCRIPTION OF THE FIGURES

The present invention is illustrated by way of example and not by way of limitation in the figures of the accompanying drawings in which references indicate similar elements and in which.

DETAILED DESCRIPTION

I. Overview of Solid State Disk

Figure 1:
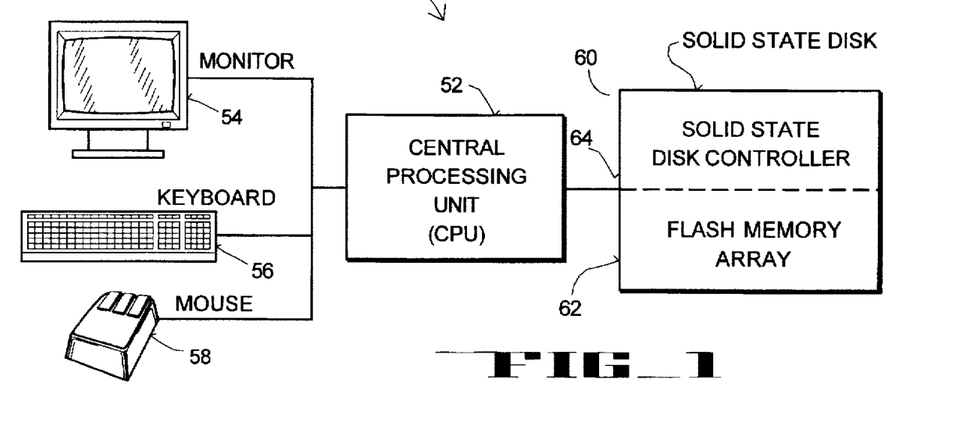
FIG. 1 is a block diagram of a personal computer including a solid state memory disk.

FIG. 1 illustrates in block diagram form personal computer 50. Personal computer 50 includes central processing unit (CPU) 52 and monitor 54 for visually displaying information to a computer user. Keyboard 56 allows the computer user to input data to CPU 52. By moving mouse 58 the computer user moves a pointer displayed on monitor 54. Personal computer 50 uses solid state memory disk 60 for mass memory storage, rather than a hard magnetic disk. Solid state disk 60 includes solid state disk controller 64, which controls nonvolatile semiconductor memory array 62. Nonvolatile semiconductor memory array 62 is also referred to as FLASH array 62.

Solid state disk 60 achieves write speeds close to conventional magnetic disk drives by writing a sector of data to a new location each time the sector of data is revised, rather than erasing the previous physical location and writing the revised sector of data to that same physical location. As a result of this practice, solid state disk 60 becomes sprinkled with invalid user data, which is also referred to as dirty memory. Recovering the memory space occupied by dirty memory mandates clean-up. Stated slightly differently, the write practices of solid state disk controller 64 require that invalid user data be converted into free memory.

Clean-up is managed by a finite state machine, called a clean-up state machine. The clean-up state machine generally runs in the relatively long periods of time when central processing unit 52 is not issuing read/write commands. Performing clean-up during these inactive periods is usually adequate to maintain sufficient free memory for the needs of host central processing unit 52. However, reclamation of dirty memory during periods of host inactivity can be overrun if host CPU 52 writes continuously to solid state disk 60. Once reclamation of dirty memory is overrun solid state disk 60 may not be able to perform host writes in the period of time allotted by industry standard interface specifications. When this occurs a write error could be displayed to the computer user on monitor 54.

The method of the present invention improves the performance of solid state disk 60 by performing clean-up of flash memory array 62 during time allotted for host command execution. That is to say, each time a host command is received from host CPU 52, the host command is executed and then available free memory is examined to determine whether clean-up is necessary. If so, a number of clean-up states are executed during the time allotted for host command execution. Thus, the method of the present invention prevents the clean-up from being overrun and thus adversely affecting the perceived performance of solid state disk 60.

A. FLASH Array and Block File Structure

Understanding of clean-up is aided by an understanding of FLASH array 62 because the program and erase characteristics of FLASH array 62 strongly influence clean-up. The FLASH devices within FLASH array 62 must be erased a block at a time, but can be programmed a byte at a time. Once programmed to a 0, a bit of FLASH memory cannot be programmed to a 1 without first erasing an entire block. Erased bytes of memory are referred to as "free" because they are ready to be written.

Erasure of FLASH memory is a slow process. Performing an erase each time a sector of data is written is impractical. Writes would be slow and power consumption inefficient because an entire block pair, 128 Kbytes, would have to be erased just to write one sector, 512 bytes. To allow rapid sector writes, solid state disk controller 64 writes each sector of data to a new, free location each time a sector of data is written. As a result of this write practice there may be several versions of the sector data associated with a single sector number. The most recent version of the sector data is referred to as a "good sector," "valid sector" or a "user sector." In contrast, the earlier version of the sector is "invalid" and will be marked as "dirty."

The actual amount of FLASH memory within FLASH array 62 cannot greatly exceed the amount stated as available to the user because FLASH memory is relatively expensive. Stated another way, when the amount of reserve memory within FLASH array 62 is lean dirty sectors must be converted into free memory to ensure the availability of memory for writes by CPU 52.

Figure 2:
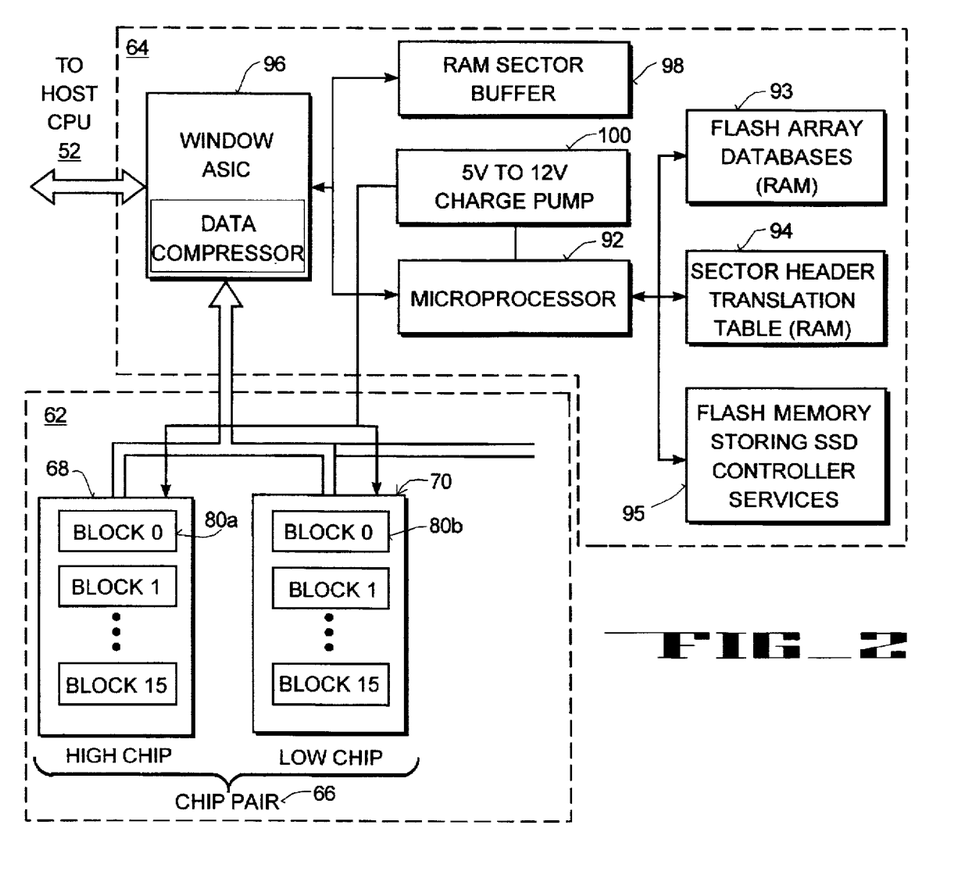
FIG. 2 is a block diagram of a solid state memory disk.

FIG. 2 illustrates in block diagram form FLASH array 62 and solid state disk controller 64 of solid state disk 60. In one embodiment, FLASH array 62 uses several 1 megabyte (1 MB×8) FLASH memory chips. These FLASH memories include a write state machine for automatically controlling erasure and programming. Each FLASH chip inputs and outputs data 8 bits at a time. To permit word-wide input and output, FLASH array 62 is organized as chip pairs of FLASH devices, only one chip pair 66 of which is shown. High chip 68 of chip pair 66 stores the high byte of a word, while low chip 70 stores the low byte of a word. Solid state disk controller 64 is thus able to treat each chip pair as a single 16 bit-wide memory device. Word-wide input and output gives solid state disk 60 a speed advantage compared to magnetic drives, which use serial bit stream I/O.

Each chip pair is organized as 16 blocks, each including 128 Kbytes of memory. Because each block of memory can store many sectors of data, each block includes a block sector translation table (BSTT) 84 (shown in FIG. 3) to identify and locate each sector of data.

Figure 3:
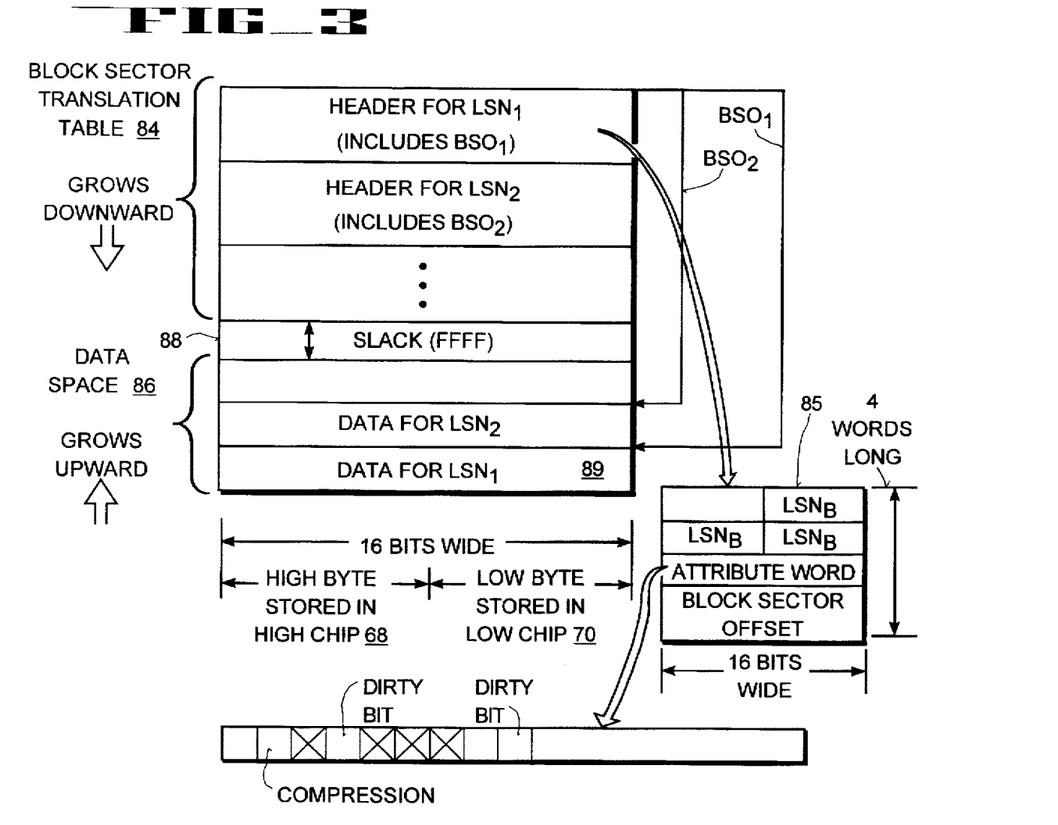
FIG. 3 is a block diagram of a block file structure.

FIG. 3 illustrates block 80 and the file structure used by it and all other blocks. Block 80 is represented as a single word wide structure but is actually stored in two FLASH chips. The high byte of each word is stored in high chip 68 and the low byte of each word is stored in low chip 70.

The data structure of block 80 includes block sector translation table 84 and data space 86. Block sector translation table 84 stores headers. A header is a block of information about one logical sector number and its associated data. As used herein a logical sector number (LSN) refers to a sector number stored within a BSTT. A sector number is a sector identifier received from CPU 52, which the CPU believes corresponds to a fixed physical location. However, as a result of the write policy used by solid state disk 60, an LSN does not correspond to a fixed physical location. Also as a result of the write policy used, several headers and LSNs may correspond to a single sector number.

A header is created for each and every sector number during disk formatting.

Header 85 includes an attribute word that contains a great deal of information about the sector data associated with the header. One bit indicates whether or not the sector data has been compressed. The last piece of information stored in header 85 is a block sector offset (BSO). The BSO is an offset from the top of the block to the start of FLASH memory space associated with the header. Memory space is allocated to a header whether or not data is stored in that space.

Because data for one sector is butted up against data for another sector in data space 86, each BSO indicates the top of data for one sector and the bottom of data for another sector. For example, the block offset for sector 1, $BSO_1$, points to the start of the data associated with $LSN_1$. $BSO_1$ also points to the bottom of data associated with $LSN_2$. Another way of looking at block sector translation table 84 is that each LSN is sandwiched between two block sector offsets, one pointing to the top of the sector data and the other pointing to the bottom of the sector data. The bottom of the data associated with the sector stored at the bottom of the block, $LSN_1$, need not be indicated by a BSO as the location of the bottom of the block is known.

Block sector translation table 84 grows down toward data space 86. The first header of BSTT 84 is written at the top of block 80. The header for each succeeding sector written into block 80 is stored below the previous header.

In contrast to BSTT 84, data space 86 grows upward. The first sector of data written into block 80 is written into the bottom of data space 86. The next sector of data written into data space 86 is written immediately above the previous sector. For example, the data associated with $LSN_2$ is located within a lower range of addresses than the data associated with $LSN_1$.

The number of sectors that may be stored in data space 86 before it runs into BSTT 84 varies. This variability arises when sector data is compressed, which causes sector size to vary. With data compression, sector size may vary between 256 words to just a few words. A maximum of 2047 sectors may be stored in data space 86 given the seek strategy used by solid state disk 60.

Solid state disk controller 64 prevents BSTT 84 and data space 86 from crashing into each other as they grow. In fact, solid state disk controller 64 ensures that some slack 88 is maintained between BSTT 84 and data space 86. Slack 88 is free FLASH memory, which has not been programmed. According to the conventions of FLASH memory, a free memory location stores FFFF (hexadecimal). During seeks of block sector translation table 84, slack 88 indicates that the end of BSTT 84 has been reached.

B. Overview of the Solid State Controller Hardware

Referring once again to FIG. 2, reading, writing, and clean-up of FLASH array 62 is controlled by solid state disk controller 64. Microprocessor 92 manages these tasks using databases 93, sector header translation table (SHTT) 94 and the services of the present invention, which are stored in FLASH memory 95. Databases 93, SHTT 94, and services 95 will be described in greater detail below. An application specific integrated circuit, window ASIC 96, serves as a window to the outside world for microprocessor 92 as well as windows into the FLASH array 62. Via window ASIC 96, microprocessor 92 receives commands from CPU 52 and reads and writes to FLASH array 66. Window ASIC 96 includes four windows, (e.g., ports) allowing microprocessor 92 to repeatedly and rapidly access a number of FLASH memory locations. Data to and from CPU 52 flows through window ASIC 96 to sector buffer 98. Sector buffer 98 allows data transfers to CPU 52 to occur more rapidly than possible otherwise. Solid state disk controller 64 includes charge pump 100. Charge pump 100 converts 5 volts into the 12-volt level needed for programming and erasure. Charge pump 100 is not necessary unless the voltage levels supplied to solid state disk 60 are all below the 12-volt voltage level used to program the FLASH devices within FLASH array 62.

C. FLASH Array Database and Sector Header Translation Table

Performance of solid state disk 60 is enhanced by storing repeatedly used information in random access memory (RAM). This information is referred to as FLASH array databases 93 because it generally relates to current characteristics of FLASH array 62. Information within FLASH array databases 93 includes:

1. The total number of dirty words within FLASH array 62 (TDFA);

2. The total number of dirty words in each FLASH block ($TDFB_N$);

3. The total number of free words within FLASH array 62 (TFFA);

4. The number of free words within each FLASH chip pair ($TFFC_M$); and

5. The total number of free words within each FLASH block ($TFFB_N$).

The use of FLASH array databases 93 by solid state disk controller 64 will be described below.

Sector header translation table (SHTT) 94 translates a sector number into a pointer to an associated sector of data. To permit its frequent and easy modification, SHTT 94 is preferably stored in RAM. The pointer supplied by sector header translation table 94 does not point directly to the data associated with the given sector number. Rather, the pointer supplied by SHTT 94 points to a location within BSTT 84 near the header associated with the sector number.

Figure 4:
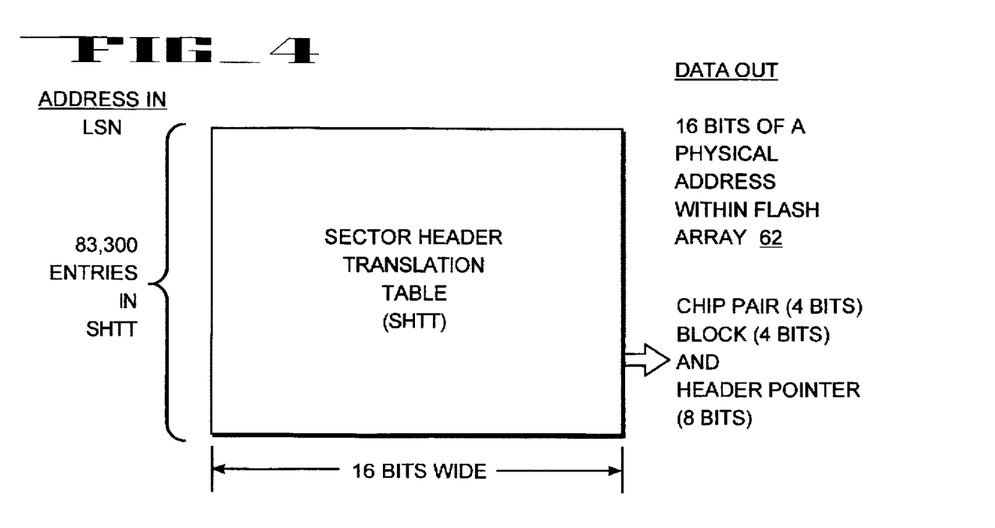
FIG. 4 is a block diagram of a first embodiment of the sector header translation table.

The SHTT 94 shown in FIG. 4 stores a pointer for every one of the possible 83,300 sector numbers of data of an industry standard 40 MB disk drive. Sixteen bits are stored for each entry in SHTT 94. Four of the bits indicate the chip pair in which the sector data being sought is stored. Another four bits indicate the particular block in which the sector is stored. The remaining 8 bits represent an offset from the top of the block to a header which is near the desired header. This offset is called a header pointer. Using 8 bits to represent the header pointer means that there are 256 header pointers available to locate a maximum of 2047 headers. Consequently, a maximum of 8 headers must be scanned in BSTT 84 to locate the desired header. Stated another way, SHTT 94a requires a two tiered search to locate the data associated with a particular sector number. First, SHTT 94a is searched to locate a particular chip, block and header pointer. Second, the indicated area of BSTT 84 is searched to find the header associated with the sector number.

II. Solid State Disk Controller

The heart of solid state disk controller 64 is the set of services stored within FLASH memory 95. These services control the reading, writing, and cleaning-up of FLASH array 62. These services help create the illusion that CPU 52 is dealing with an industry-standard hard magnetic disk drive.

Figure 5:
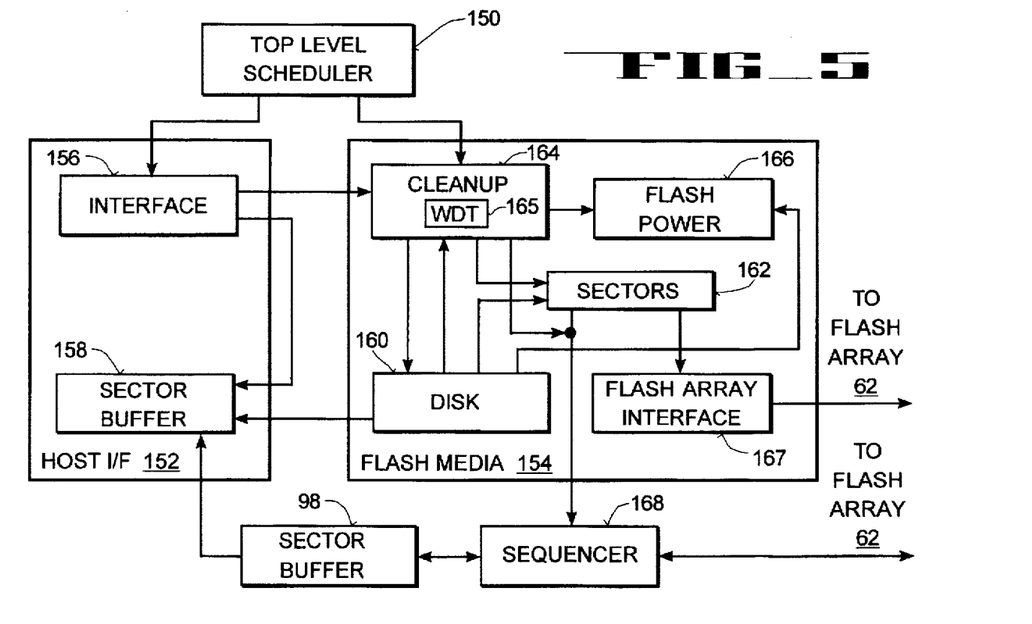
FIG. 5 is a diagram of the services of the solid state disk controller.

The diagram of FIG. 5 illustrates the general organization and interrelationship of services used by solid state controller 64. The services of solid state disk controller 64 are organized into three classes: top level scheduler 150, host interface 152, and FLASH media 154. Top level scheduler 150 handles the allocation of CPU 92 processing time between the other two classes 152 and 154. Host interface 152 interprets industry standard disk drive commands from CPU 52 and translates them into commands that FLASH media 154 can act upon. FLASH media 154 interfaces directly with FLASH array 62, responding to read and write requests from host interface 152. FLASH media 154 also manages the cleaning-up of FLASH array 62.

The scheduling of host interface 152 and FLASH media 154 is a relatively simple task. Power-up of solid state disk 60 starts top level scheduler 150. It initializes the solid state disk 60 and then calls host interface 152. This allocates to CPU 52 all the resources of solid state disk 60. When host interface 152 returns control to top level scheduler 150, clean-up services 164 is called. If a clean-up is on-going, then a slice of CPU execution time, 500 μ seconds in one embodiment, is allocated for clean-up. When clean-up returns control to top level scheduler 150, host interface 152 is called again. Top level scheduler 150 repeats the process again and again for as long as solid state disk 60 is powered up.

Host interface 152 includes two classes of services, interface 156 and sector buffer 158. Interface 156 emulates an AT-IDE (Integrated Device Electronics) hard disk interface. Interface 156 handles ATA (AT attachment) command interrupts and translates ATA commands into commands comprehensible by FLASH media 154. In alternate embodiments, host interface 156 may simulate a SCSI (Small Computer System) disk interface or other standard disk drive interface. Sector buffer 158 manages the usage of sector buffer 98.

FLASH media 154 includes five types of services: disk 160, sectors 162, clean-up 164, FLASH power 166 and FLASH array interface 167. Disk 160 services read and write requests from interface 156. Disk 160 also translates other commands from interface 156 and delegates them for execution to fellow services 162, 164, 166 and 167. Sector services 162 is responsible for most tasks relating to sectors stored within FLASH array 62. Sectors 162 maintains FLASH array database 93 used by both disk 160 and clean-up 164, as well as allocating free memory space within FLASH array 62. Sectors 162 also controls the reading of data from FLASH array 62 via FLASH array interface 167 and sequencer 168. FLASH power 166 is essentially a device driver; that is, it generates the voltage levels necessary to read or write to FLASH array 62. FLASH array interface 167 handles the low level routines which directly control the reading and writing of FLASH array 62. Sequencer 168 handles the movement of data between sector buffer 98 and FLASH array 62. FLASH power 166 manages the limited current budget of solid state disk 60, which in one embodiment is only 120 MA.

Just as its name implies, clean-up 164 manages the clean-up of FLASH array 62 and implements the present service for executing clean-up states during time allotted for host command execution. Clean-up 164 includes a watchdog timer, which is indicated by WDT 165 in FIG. 5. Clean-up 164 turns on watchdog timer 165 each time interface 156 indicates receipt of a command interrupt from host CPU 52. As will be described in more detail herein below, watchdog timer 165 facilitates the execution of clean-up states during time allocated for performance of host commands. Thus, watchdog timer 165 permits solid state disk drive 60 to capitalize on its write speed to reclaim dirty memory.

A. Reading and Writing Sectors to FLASH Array 62

Briefly described, reading a sector is a three step process. First, SHTT 94 is searched for a pointer to the header associated with the sector number. Second, the header is located and its attribute word is examined to see if the attached data is valid. Third, if the sector data associated with header is valid, its location is determined and returned to CPU 52.

Writing a sector of data to FLASH array 62 involves three major tasks. First, enough free memory to write the sector data must be located and reserved. Second, any previous version of sector data with the same LSN is marked dirty and sector header translation 94 is updated. Third, the sector data and its header are written into the appropriate block.

Allocating memory space within FLASH array 62 for writes or clean-up is a complex and critical task. Not only must memory space be allocated, an appropriate location must be chosen to prevent performance degradation. Choosing a block for a sector write potentially involves four major decisions. First, are there sufficient FLASH memory reserves to allow the write? Second, is there enough free memory in the block to which the current process was last allocated to store the current sector? If the answer to the second question is no, then a third and a fourth question must be asked. Is there a block with enough free FLASH memory to store the sector data? Is that block an appropriate block in which to store this sector?

The fourth decision is a difficult one because whether a block is an appropriate block depends on a number of factors. First, the block chosen cannot be included in a busy chip pair. Waiting on a busy chip pair is avoided because it diminishes the speed with which commands from CPU 52 are obeyed. Second, the block chosen should not be within a block targeted for clean-up. Data written into a block targeted for clean-up will just have to be relocated right away. Third, the block chosen should not be within the same chip pair allocated to another process. This avoids data fragmentation, which eventually results in foreground erase and decrease in power efficiency. Data fragmentation refers to a random distribution of clean, dirty, and free sectors throughout FLASH array 62. Data fragmentation is catastrophic to solid state disk performance when reserves of memory space are lean. By allocating writes initiated by CPU 52 into different chip pairs than writes initiated by clean-up, dirty sectors are likely to be grouped together. This reduces the number of sectors that must be copied out of a block during clean-up, thereby improving power efficiency and clean-up performance.

III. Clean-up of the Solid State Disk

Solid state disk drive 60 achieves write speeds close to conventional magnetic disk drives by writing a sector of data to a new location each time it is revised, rather than erasing the previous location and writing the revised data to that same physical location. As a result of this practice, solid state disk 60 becomes sprinkled with dirty sectors, that is to say invalid user data. Recovering the memory space occupied by dirty sectors mandates clean-up. Stated slightly differently, the write practices of solid state disk controller 64 require that invalid user data be converted into free memory.

Execution of clean-up states during the periods of time when host CPU 52 is inactive is generally adequate to maintain sufficient free memory because CPU 52 generally reads and writes in bursts. As a result, there are relatively long periods of time when microprocessor 92 is free to perform clean-up. Execution of clean-up states during host command execution prevents clean-up from being overrun during prolonged host writes to FLASH array 62.

Clean-up is managed by a finite state machine, called a clean-up state machine (CSM). That is, clean-up is achieved using a finite number of states, or services, which are chained together. Each clean-up state points to the next state, in effect chaining each state to another state. Each state takes no more than 500 μseconds of CPU 92 time to execute.

Clean-up may use a single clean-up state machine or two clean-up state machines, and is granted execution time when host interface 152 is inactive. Clean-up is initiated when an enable CSM service is called. The enable CSM service is called whenever the host writes to solid state memory disk 60. This service activates a clean-up state machine by setting a CSM next state pointer to a clean-up state.

Figure 6:
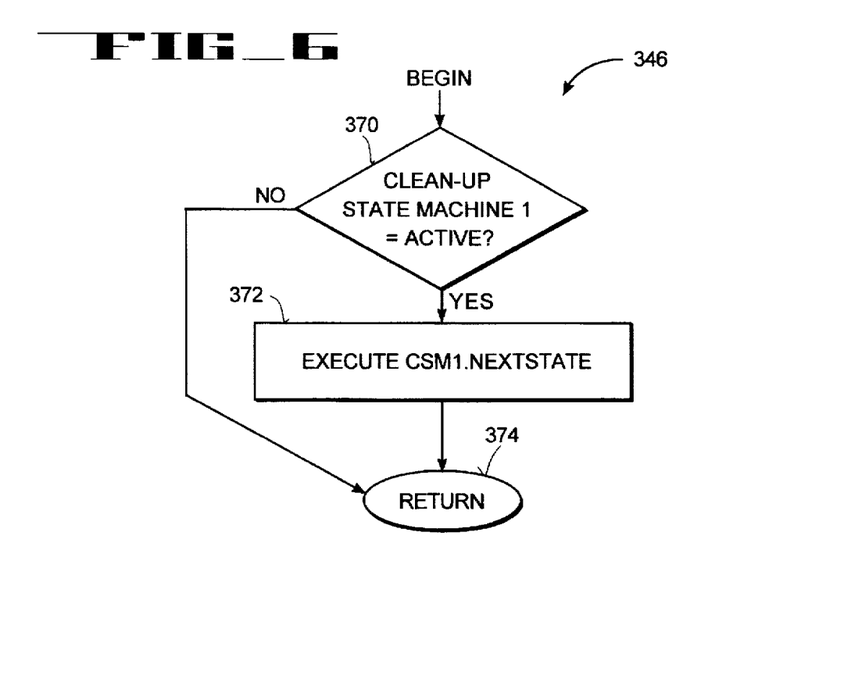
FIG. 6 is a flow diagram for executing one state of a clean-up state machine.

Execution of that first clean-up state occurs whenever top level scheduler 150 allocates CPU 92 time to clean-up. Top level scheduler 150 does so by calling execute one state service 346, which is illustrated in FIG. 6. Execute one state 346 calls the state pointed to by the CSM next state pointer. That state, whichever it is, modifies the next state pointer prior to surrendering control of CPU 92. Thus, each time top level scheduler 150 allocates execution time to clean-up another step will be executed by calling execute one state.

As illustrated in FIG. 6, the mechanism that allows a single service to chain many states together is the CSM next state pointer. The next state pointer is updated at the end of each state.

Upon entry to execute one state 346, microprocessor 92 determines in step 370 whether the clean-up state machine, CSM, is active by examining CSM status. If CSM is inactive, nothing is to be done but to return control to the caller in step 374. Otherwise, the state pointed to by the CSM next state pointer is executed. Afterward, control is returned to the caller in step 374.

A. The Clean-up State Machine

What is the chain of events during clean-up? Briefly described, clean-up involves three major tasks. First, a block is selected as the focus of clean-up. Second, on a valid sector-by-valid sector basis, user data is relocated from the focus block into destination blocks. Relocation of user data is itself a multistep process, requiring allocation of memory, copying of the sector into the destination blocks, and updating of FLASH databases 93. Third, after all valid user data has been copied out of it, the focus block is erased, converting sectors of invalid user data into free memory.

Figure 7:
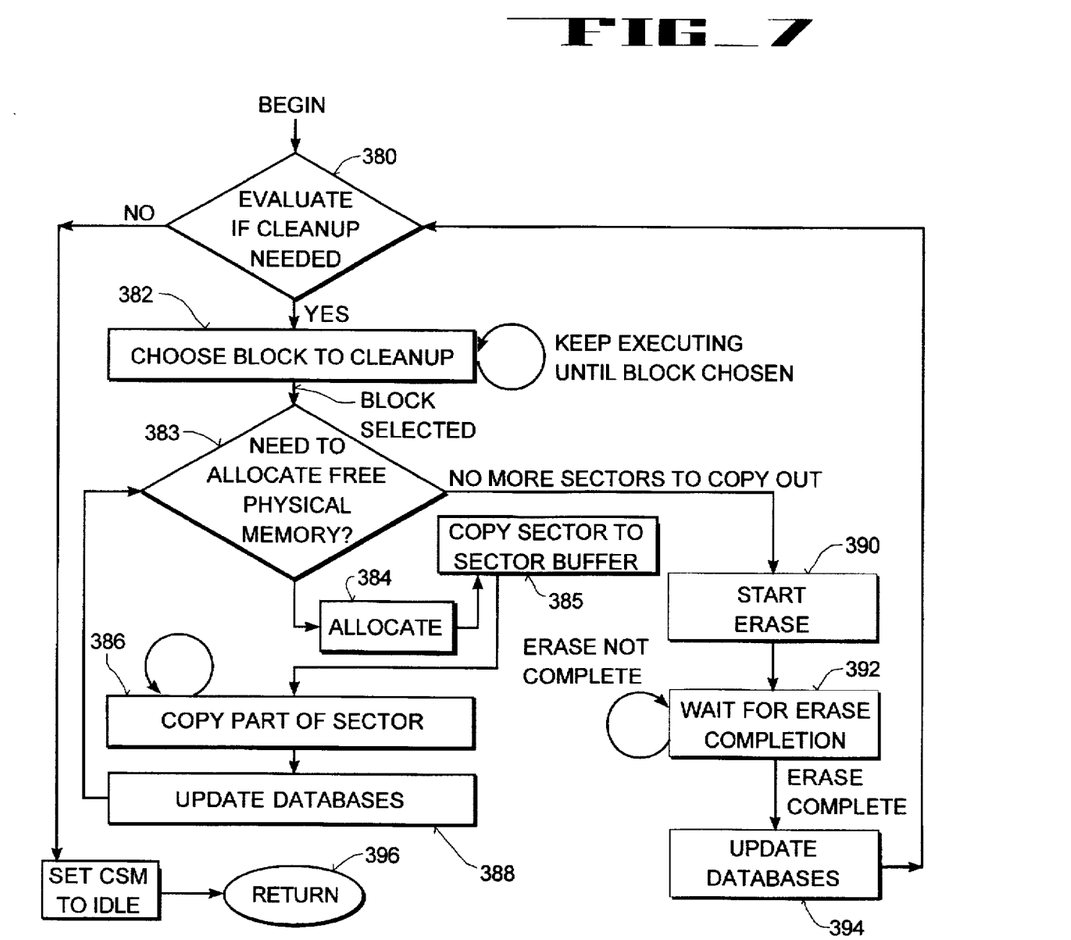
FIG. 7 is a flow diagram of the states of a clean-up state machine.

FIG. 7 gives an overview of clean-up by illustrating each state of a clean-up state machine. Each bubble in FIG. 7 represents one state, or service, of the clean-up state machine. The arrows between states represent the next state pointed to by the CSM next state pointer at the end of a state.

Clean-up begins in state 380 by evaluating whether clean-up is necessary. If clean-up is not necessary microprocessor 92 branches down to state 396. This returns control of microprocessor 92 to top level scheduler 150. On the other hand, if clean-up is deemed necessary, a number of blocks will be cleaned up. The selected number of blocks is indicated by a counter. Afterward, microprocessor 92 is pointed to state 382 by the CSM next state pointer.

Clean-up begins in earnest in state 382 by selecting a focus block to clean-up. The goal in choosing a focus block is to select the block that it is most cost effective to clean. Cost effective clean-up involves striking a balance between keeping FLASH array 62 so clean that power consumption is excessive and keeping FLASH array 62 so dirty that foreground clean-up frequently occurs. The next state pointer then points microprocessor 92 to state 383.

Prior to cleaning up dirty sectors within the focus block, valid sectors of user data must be safely relocated. This task requires branching through states 383, 384, 385, 386, and 388 repeatedly until each and every sector of user data within the focus block has been safely copied into new locations. Relocation of user data begins in state 384 by allocating a new physical location for one good sector of user data. The block selected as the new location is referred to as a destination block. According to this terminology, clean-up has one focus block but may have many destination blocks. Microprocessor 92 is then pointed to state 385 by the CSM next state pointer.

In state 385, the sector is copied from the focus block into sector buffer 98.

In state 386 microprocessor 92 copies part of a valid sector from the sector buffer to the current destination block. Only a part of the valid sector is copied at one time given write speeds and the desire to keep clean-up from impacting response to read and write commands from CPU 52. Thus, microprocessor 92 may pass though state 386 several times before a valid sector is completely copied into destination block. Once the valid sector has been completely copied, the CSM next state pointer directs microprocessor 92 to state 388.

During state 388 microprocessor 92 updates databases 93 and sector header translation table 94 so that it points to the new location of the sector just copied from the focus block if the previous version of the data for the sector number was not marked dirty or invalid. Otherwise, microprocessor 92 marks dirty the version of the sector it has just copied. Finally, microprocessor 92 finishes writing the header associated with the new version of the sector data for the sector number. Microprocessor 92 then returns to state 383.

Upon reentry to state 383, microprocessor 92 determines whether every valid sector within the focus block has been relocated. If not, another valid sector will be selected for relocation, and microprocessor 92 will branch through states 384, 385, 386, 388 and 383 until every valid sector within the focus block has been relocated. When that occurs, the CSM next state pointer directs microprocessor 92 to state 390.

Microprocessor 92 begins erasure of the focus block in state 390. Microprocessor 92 initiates erasure by giving an erase command to a chip pair and indicating the block to be erased. This done, microprocessor 92 proceeds to state 392 to wait for the completion of erasure. The CSM remains in state 392 until the chip pair including the focus block indicates completion of erasure.

The focus block erased, microprocessor 92 updates databases 93 and updates and copies block attribute data 90 back into the focus block, step 394. This done microprocessor 92 is redirected to state 380 by the CSM next state pointer.

Upon reentry to state 380, microprocessor 92 examines the block counter to determine if another focus block should be selected. If so, microprocessor 92 will branch through states 382, 383, 384, 385, 386, 388, 390, 392, and 394 as described. Otherwise, microprocessor 92 branches to step 396, clean-up complete.

B. Executing Clean-up States During Time Allotted To Host Command Execution

Figure 8:
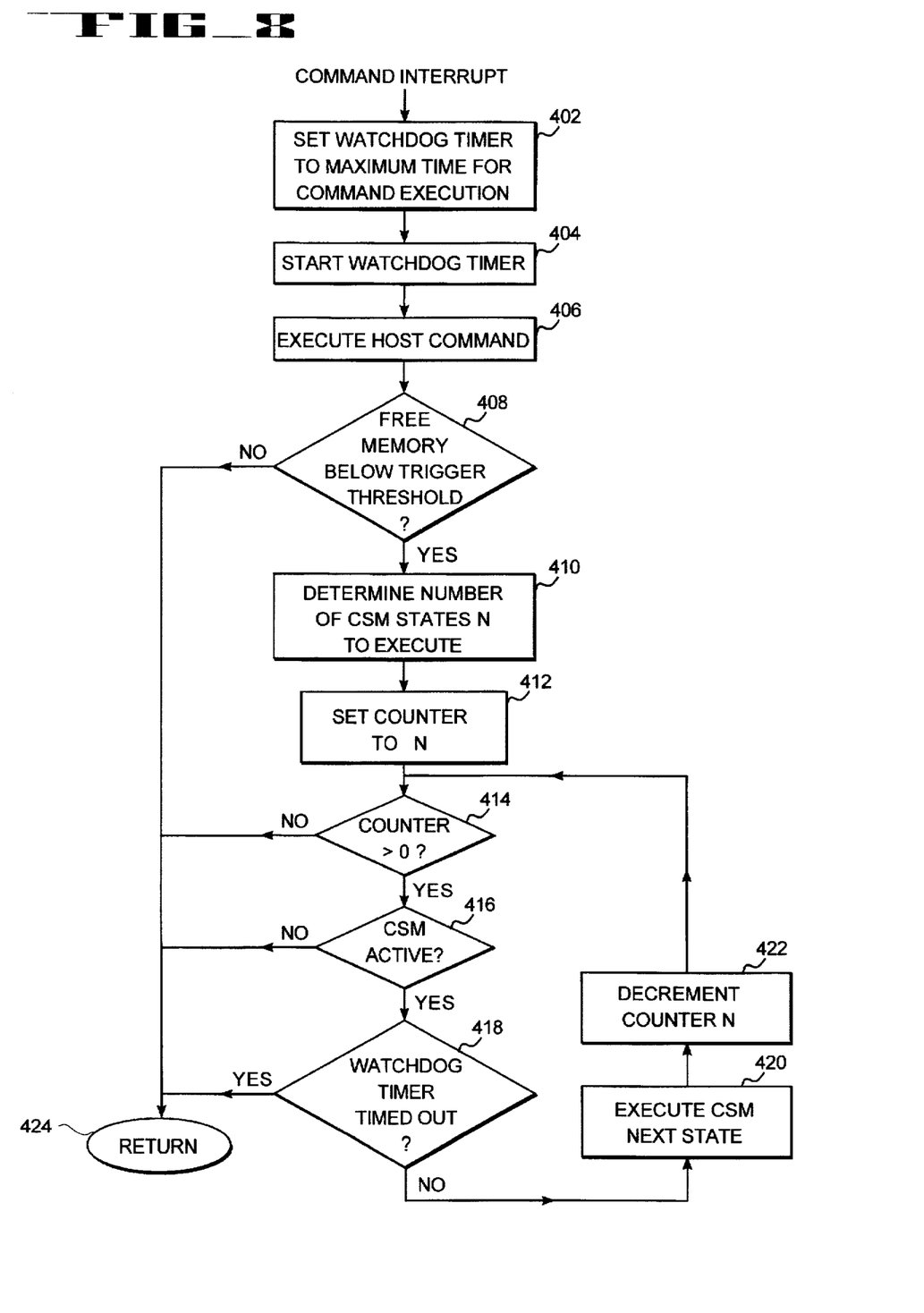
FIG. 8 is a flow diagram of a method for performing clean-up during time allotted to host command execution.

FIG. 8 illustrates in flow diagram form a service implemented by interface 156 to execute clean-up states during time allocated for execution of commands received from CPU 52. The service shown in FIG. 8 capitalizes upon the read/write speeds of solid state disk 60 to prevent overrunning clean-up by host writes while still executing commands within industry standard time specifications. This result is achieved by executing the host command first and then, if necessary, executing as many clean-up states as possible in the remaining time allotted.

Whenever interlace 156 receives a command interrupt from CPU 52 microprocessor 92 responds by setting watchdog timer 165 to the maximum time allowed for execution of the command. This is illustrated as step 402 in FIG. 8. Microprocessor 92 then starts watchdog timer 165 in step 404.

To guarantee adequate time to perform the command, the command is executed first in step 406. Any time remaining subsequent to execution of the command is now available for cleaning up FLASH array 62. Thus, microprocessor 92 branches from step 406 to step 408.

Microprocessor 92 determines in step 408 whether any clean-up states should be executed. Microprocessor 92 does so by determining whether the amount of free memory remaining within FLASH array 62 is below a trigger threshold. The exact amount of free memory required to trigger clean-up state execution during host command execution varies according to the type of system performance desired. The greater the amount of free memory required to trigger clean-up during host command execution, the less likely clean-up is to be overrun by host writes. However, the perceived performance of solid state disk 60 in response to host commands will fall as the amount of free memory required to trigger clean-up increases. Conversely, as the amount of free memory required to trigger clean-up during host command execution decreases, the perceived performance of solid state disk 60 increases. That is to say, the user of solid state disk 60 will perceive that host commands are executed more quickly. However, as the amount of free memory required to trigger clean-up state execution during host command execution decreases the likelihood of clean-up being overrun by a large number of sequential host writes increases. Obviously then, choosing the trigger point will be a design choice depending upon the particular perceived solid state disk performance desired and the type of environment it is anticipated that the solid state disk 60 will operate in.

If the amount of free memory currently available within FLASH array 62 exceeds the trigger threshold then microprocessor 92 returns control to top level scheduler 150 by branching to step 424 and no clean-up states are executed. On the other hand, if the amount of free memory currently available within FLASH array 62 is less than the trigger threshold then microprocessor 92 will branch to step 410.

Having decided that some clean-up state execution is appropriate, in step 410 microprocessor 92 determines the number of clean-up states that should be executed in the remaining allotted time. Again, the number of states to be executed is a design choice depending upon the desired perceived performance. The greater the number of clean-up states executed during time allocated to command execution the greater the delay perceived by the host in the execution of a command. However, increasing the number of clean-up states executed during the time allotted to host command execution decreases the likelihood that clean-up will be overrun by a large number of sequential host writes. Conversely, host CPU 52 will perceive improved performance in the execution of its commands by reducing the number of clean-up states executed during time allotted to execute host commands. This perceived improved performance comes at the cost of increasing the likelihood that clean-up will be overrun.

According to one embodiment of the present invention, the number of clean-up states to be executed in the remaining time is related to the number of blocks of free memory currently available within FLASH array 62. The relationship between the number of states to be executed and the number of free blocks can be expressed mathematically. Let us define the number of clean-up states to be executed during time allotted for host command execution as "N" and the number of blocks of free memory currently available within flash array 64 as "FB". Further define an arbitrary constant "C". Given these definitions, the relationship between free blocks and number of states to be executed can be expressed in one embodiment as:

$$N = \frac{C}{FB}$$

Figure 9:
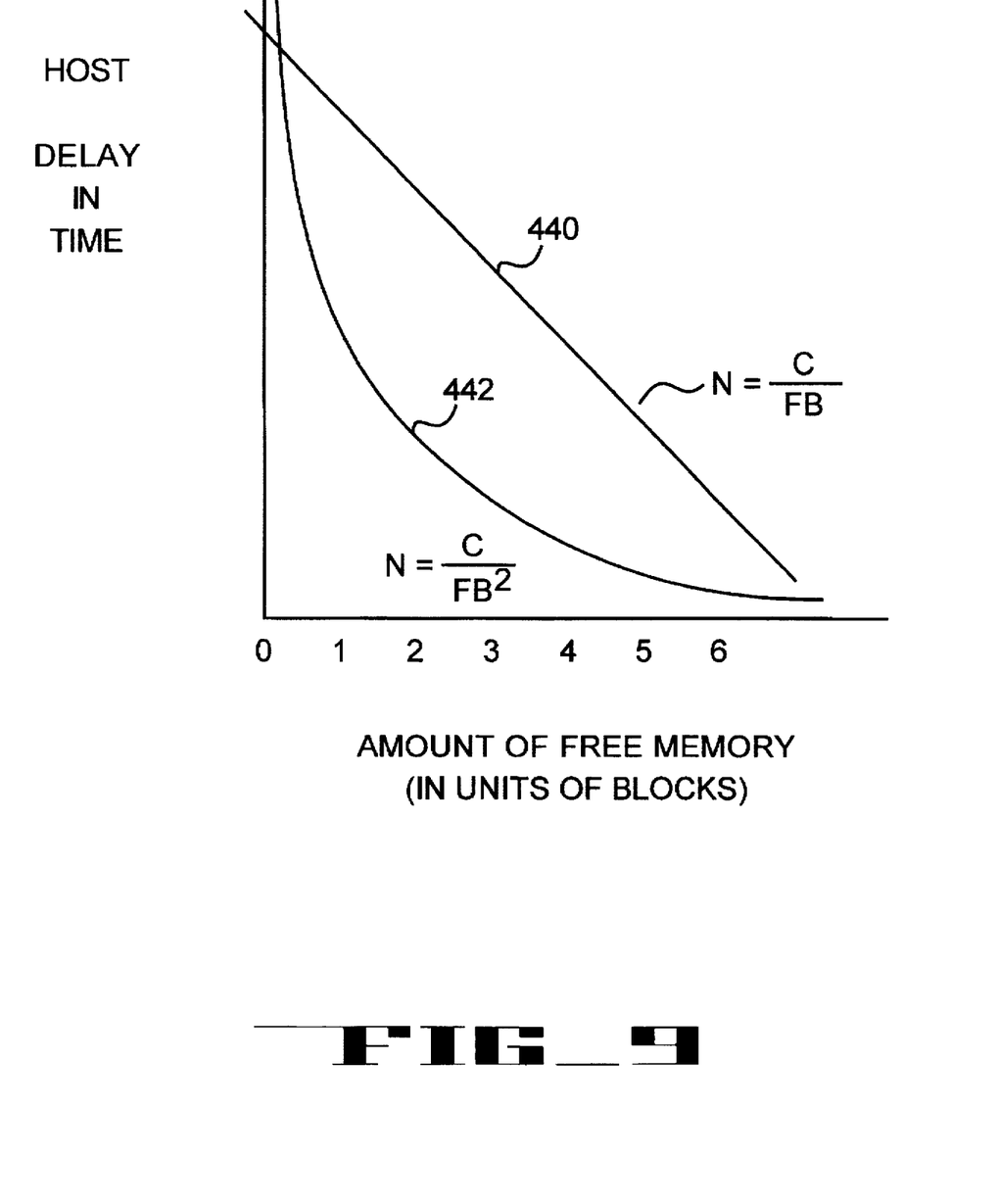
FIG. 9 illustrates response curves for two methods of determining a number of blocks of memory to clean-up during time allotted to host command execution.

FIG. 9 illustrates via line 440 the amount of additional delay experienced by host CPU 52 with respect to the number of free blocks of memory, given $$N = \frac{C}{FB} .$$

As can be seen, the amount of delay experienced by host CPU 52 increases linearly as the number of free blocks of memory decreases. This is because the perceived execution time of a host command increases as the number N increases.

In yet another embodiment of the present invention the number of clean-up states to be executed, N, is inversely proportional to the square of the number of free blocks. This relationship can be expresses mathematically as;

$$N = \frac{C}{FB} 2$$

FIG. 9 also illustrates by curve 442 the delay experienced by host CPU 52 as a function of the number of free blocks given $$N = \frac{C}{FB} 2.$$

The amount of delay experienced by the host during the execution of a command is less for curve 442 as compared to line 440 when the number of free blocks is fairly large. As with line 440, the amount of delay experienced by host CPU 52 along curve 442 increases as the number of free blocks decreases.

Other relationships between the number of free blocks and the number of clean-up states to be executed are possible. It may be desirable for example, to execute as many clean-up states as possible in the remaining time when the amount of free memory falls below a certain minimum amount.

In any case, during step 410 microprocessor 92 determines some number, N, of clean-up states to be executed in the remaining time allotted for host command execution. Once it makes this decision, microprocessor 92 branches to step 412, where a counter is set equal to N. From step 412 microprocessor 92 branches to step 414.

Microprocessor 92 determines whether the desired number of CSM states have already been executed in step 414. Microprocessor 92 makes this determination by examining the value of the counter. If the counter's value is greater than 0 then not all of the desired number of clean-up states have executed. In this case microprocessor 92 branches from step 414 to step 416.

During step 416 microprocessor 92 determines whether execution of any additional clean-up states is necessary by examining the status of the clean-up state machine. If the CSM is inactive it has just recently converted a large quantity of invalid sector data into free memory. If so, no additional clean-up states need be executed just yet. In that case, microprocessor 92 stops further clean-up state execution by branching to step 424. On the other hand, if the CSM is active, additional clean-up states should be executed. Microprocessor 92 responds to this situation by branching to step 418.

In the event that watch dog timer 165 times out before the desired number of clean-up states have been executed and before all states of the clean-up state machine have been executed, microprocessor 92 responds by branching from step 418 to step 424. Microprocessor 92 once again returns control to top level scheduler 150 in step 424. On the other hand, if the watch dog timer 165 has not timed out, then microprocessor 92 branches to step 420.

Microprocessor 92 executes one state of the clean-up state machine in step 420. Microprocessor 92 does so using the execute one state service 346, which is illustrated in FIG. 6 and has been discussed previously. After completing execution of the clean-up state indicated by the CSM next state pointer, microprocessor 92 branches to step 422.

The counter N is decremented in step 422 to indicate that another clean-up state has been executed. Microprocessor 92 then returns to step 414 from 422. Once again, microprocessor 92 determines whether another CSM state should be executed by examining the value of the counter. Once all the desired clean-up states have been executed, then microprocessor 92 branches to step 424.

If the counter value reaches 0 before watch dog timer 165 times out microprocessor 92 branches from step 414 to step 424. Having completed the execution of the desired number of clean-up states, microprocessor 92 stops the clean-up state machine simply by, returning control of microprocessor 92 to top level scheduler 150.

Thus, a method of converting invalid user data to free memory within a solid state memory disk during the time allotted to execute commands from a host CPU has been described. Whenever a command interrupt is received from the host CPU a watch dog timer is set and started. The indicated command is executed and in the remaining time allotted for host command execution it is determined whether clean-up should be performed, and, if so, the number of clean-up states that should be executed. Clean-up states are then executed while the watchdog timer permits.

In the foregoing specification, the invention has been described with reference to specific exemplary embodiments thereof. These descriptions will, however, be departing from the broader spirit and scope of the invention as set forth in the appended claims. The specification and drawings are, accordingly, to be regarded in an illustrative rather than a restrictive sense.

What is claimed is:

1. In a solid state memory disk including a flash memory array, a method of performing clean-up of the flash memory array during time allotted to execute host commands from a standard interface, the flash memory array including free memory, valid user data, and invalid user data, the solid state memory disk including a clean-up state machine for converting invalid user data into free flash memory via erasure, the clean-up state machine including a multiplicity of states, the method comprising the steps of:

a) receiving a command from the standard interface;
   b) setting a timer to a maximum time which is not greater than the time allotted to execute host commands received from the standard interface;
   c) starting the timer;
   d) executing the command;
   e) executing a state of the clean-up state machine;
   f) determining if the timer has timed out;
   g) executing additional states of the clean-up state machine until the timer times out; and
   h) returning control of the solid state memory disk to the standard interface in response to the timer timing out.

2. The method of claim 1 wherein the command is a read command.

3. The method of claim 1 wherein the command is a write command.

4. The method of claim 1 wherein the standard interface is an AT Attachment-Integrated Device Electronics (ATA-IDE) interface.

5. In a solid state memory disk including a flash memory array, a method of performing clean-up of the flash memory array during time allowed for execution of a host command from a standard interface, the flash memory array including free memory, valid user data, and invalid user data, the solid state memory disk including a clean-up state machine for converting invalid user data into free memory via erasure, the clean-up state machine including a multiplicity of states, the method comprising the steps of:

a) receiving a host command from the standard interface;
   b) setting a timer to a maximum time allowed to execute the host command from the standard interface and starting the timer;
   c) executing the command;
   d) determining a first number of states of the clean-up state machine to be executed;
   e) executing a state of the clean-up state machine;
   f) repeating step e) until either the timer has timed out or the first number of states has been executed; and
   g) returning control of the solid state memory disk to the standard interface in response to either the timer timing out or the first number of states having been executed.

6. The method of claim 5 wherein the command is a read command.

7. The method of claim 5 wherein the command is a write command.

8. The method of claim 5 wherein the standard interface is an AT Attachment-Integrated Device Electronics (ATA-IDE) interface.

9. The method of claim 5 wherein the first number of clean-up states to be executed is determined based upon an amount of free memory currently available within the flash memory array.

10. The method of claim 9 wherein the first number of clean-up states is related to an inverse of the amount of free memory within the flash array.

11. The method claim 10 wherein the first number of clean-up states is related to a square of the inverse of the amount of free memory within the flash array.

12. In a solid state memory disk having a flash memory array, a method of performing clean-up of the flash memory array by converting invalid user data within the flash memory array into free flash memory during time allotted for execution of a host command from a standard interface, the flash memory array including free memory, valid user data and invalid user data, the solid state memory disk including a clean-up state machine for controlling the conversion of invalid user data into free flash memory, the clean-up state machine including a plurality of clean-up states, the method comprising the steps of:

a) receiving a host command from the standard interface;
   b) setting a timer to a maximum time allotted to execute the host command from the standard interface;

c) starting the timer;

d) executing the host command;

e) determining whether the flash memory array includes a first amount of free flash memory;

f) if the flash memory array does not include the first amount of free flash memory:

1) determining a first number of states of the clean-up state machine that should be executed based upon an amount of free flash memory currently within the flash memory array;

2) executing a state of the clean-up state machine;

3) repeating step f2) if the timer has not timed out and if the first number of states has not been executed; and g) returning control of the solid state memory disk to the standard interface after the command has been executed and either the timer has timed out or the first number of states has been executed.

13. The method of claim 12 wherein the first number of states is proportional to an inverse of a square of the amount of free memory currently included in the memory array.

14. The method of claim 12 wherein the command is a read command.

15. The method of claim 12 wherein the command is a write command.

16. The method of claim 12 wherein the command is an AT Attachment (ATA) command.

17. In a solid state memory disk including a flash memory array, a method of performing clean-up of the flash memory array by converting invalid user data within the flash memory array into free flash memory during time allowed to execute a write command from an interface, the flash memory array including free memory, valid user data, and invalid user data, the solid state memory disk including a clean-up state machine for controlling the conversion of invalid user data into free flash memory, the clean-up state machine including a multiplicity of states, the method comprising the steps of:

a) receiving a write command from the interface;

b) setting a timer to a maximum time allowed to execute the write command from the interface;

c) starting the timer;

d) executing the write command;

e) determining whether an amount of free flash memory currently within the flash memory array exceeds a first amount of free flash memory;

f) if the amount of free flash memory currently within the flash memory array is less than the first amount of free flash memory:

1) executing a state of the clean-up state machine;

2) repeating step 1) if the timer has not timed out; and g) returning control of the solid state memory disk to the interface after completion of steps a) through f).

18. The method of claim 17 wherein the first number of states is proportional to an inverse of a square of the amount of free memory currently included in the flash memory array.

19. A solid state memory disk responsive to commands from an interface, the solid state memory disk comprising:

a flash memory array including valid user data, free memory and invalid user data; and a memory array controller to control reading, writing and cleaning-up of the flash memory array, the memory array controller performing clean-up of the flash memory array by converting invalid user data within the flash memory array into free memory during time allotted for execution of a command from the interface, the memory array controller including:

a clean-up state machine for converting via erasure invalid user data into free flash memory, the clean-up state machine including a plurality of states;

a timer, the timer responding to commands from the interface by setting a maximum time for execution of a command from the interface, the timer timing out when the maximum time for execution of a command has expired;

means for executing commands received from the interface; and means for executing a single state of the clean-up state machine at a time after command execution but prior to returning control of the solid state memory disk to the interface if the timer has not timed out.

20. A solid state memory disk responsive to commands from an interface, the solid state memory disk comprising:

a flash memory array storing valid user data, free memory, and invalid user data; and a memory array controller to control the reading, writing and clean-up of the flash memory array, the clean-up of the flash memory array being performed by converting invalid user data into free memory, the memory array controller performing clean-up of the flash memory array during time allotted to execute commands from the interface, the memory array controller including:

a processing unit;

a timer, the timer responding to commands from the interface by setting a maximum time allotted to execute commands, the timer timing out when the maximum time has expired; and a memory which stores services enabling the processing unit to read, write and clean-up the flash memory array, the memory storing services for clean-up of the flash memory array by converting invalid user data into free memory via a plurality of clean-up states, the memory storing services for executing the commands and instructions enabling the execution of clean-up states after execution of the commands but prior to returning control of the solid state memory disk to the interface if the timer has not timed out.

21. A computer system including:

a central processing unit; and a solid state memory disk which stores data for the central processing unit, the solid state memory disk including:

an interface coupled to the central processing unit for decoding a standard command from the central processing unit and generating a disk command;

a flash memory array including valid user data, free memory and invalid user data; and a memory array controller responsive to the disk command from the interface, the controller controlling the reading, writing and cleaning up of the flash memory array, the memory array controller performing clean-up of the flash memory array by converting invalid user data into free memory, the memory array controller performing clean-up of the flash memory array during time allotted for execution of the disk command, the memory array controller including:

a clean-up state machine for converting invalid user data into free flash memory via erasure, the clean-up state machine including a multiplicity of states;

a timer for timing a maximum time allotted to perform the disk command, the timer beginning timing in response to the disk command and timing out when the maximum time has elapsed;

means for executing the disk command received from the interface;

means for executing a state of the clean-up state machine after execution of the disk command but prior to returning control of the solid state memory disk to the interface if the timer has not timed out.

22. The computer system of claim 21 wherein the standard command is an AT Attachment-Integrated Device Electronics (ATA-IDE) interface command.

23. In a solid state memory disk including a flash memory array having both free memory and invalid user data, the solid state memory disk also including a clean-up state machine used to convert invalid user data into free flash memory via erasure, the clean-up state machine including a plurality of states, a method comprising the steps of:

a) receiving a command from a host processor via an interface;

b) executing the command; and c) executing one or more states of the clean-up state machine prior to expiration of a time allotted for execution of the command and prior to returning control of the solid state memory disk to the interface.

* * * * *

UNITED STATES PATENT AND TRADEMARK OFFICE
CERTIFICATE OF CORRECTION

PATENT NO. : 5,640,529
DATED : June 17, 1997
INVENTOR(S) : Robert N. Hasbun

It is certified that error appears in the above-indentified patent and that said Letters Patent is hereby corrected as shown below:

Title page, item [54] and col. 1, insert--TIME ALLOTTED FOR--following "DURING" and prior to "HOST"

Column 3, line 51, delete "dean-up" and insert --clean-up--.
Column 10, line 66, delete "interlace" and insert --interface--.

Signed and Sealed this

Twenty-third Day of September, 1997

Attest:

BRUCE LEHMAN

Attesting Officer

Commissioner of Patents and Trademarks